June 8, 1926.

L. STEIN 1,588,203

CHECKER BRICK

Filed August 22, 1924

INVENTOR
LOUIS STEIN
By Paul, Paul & Moore
ATTORNEYS

Patented June 8, 1926.

1,588,203

UNITED STATES PATENT OFFICE.

LOUIS STEIN, OF MINNEAPOLIS, MINNESOTA.

CHECKER BRICK.

Application filed August 22, 1924. Serial No. 733,642.

This invention relates to new and useful improvements in the design for checker-bricks such as are commonly used in the construction of ordinary carburetors and superheaters such as are generally employed in the manufacture of water gas, for the purpose of atomizing and subsequently gasifying a gaseous fluid or mixture passing therethrough.

In the manufacture of carbureted water gas, such as is commonly used in homes and other buildings for cooking, heating and various other uses, gas is evolved or generated from the reduction or decomposition of steam passing through an incandescent fuel bed, such as coke. The gas thus generated is then passed through a heated carburetor and enriched up to a desired calorific quality by the introduction of a suitable enriching fluid, which is generally sprayed or atomized into the top of the carburetor by suitable well known means. As the gas from the generator and the enriching fluid pass through the heated checker-bricks of the carburetor, they become thoroughly mixed, thereby forming a gaseous mixture which is passed through a device commonly known as a superheater, wherein the mixture of the two elements become permanently united in the formation of a commercial gas, which may then be discharged into a suitable receiving means for subsequent use.

Ordinary checker-bricks such as are commonly employed in gas-generating machines at the present time, are usually of rectangular cross-section, and therefore offer considerable resistance to the flow of gases passing therethrough with a resultant decrease in the amount of gas made per unit of time, and which, therefore, tends to decrease the efficiency of such apparatus.

The novel design of the improved form of checker-brick featured in this invention is such that the resistance to the flow of gases through the structure will be lessened. Such lessening of resistance to the flow of gas, is accomplished by shaping the checker-bricks in such a manner as to practically eliminate therefrom all flat surfaces and corners, thus providing in effect, a brick having a body substantially "stream lined" in cross-section. Also by the reduced resistance offered to flow by the employment of streamline checker-bricks in such structures, the number of bricks used in a given machine may be increased without increasing the back pressure or resistance to flow therethrough, with a resultant increase in the heat-storage capacity, and therefore efficiency thereof. Conversely, by the use of a given number of streamline checker-bricks in a gas producer, the resistance offered to the flow of gases therethrough will be reduced to the extent that the output thereof will be substantially increased.

The object of this invention therefore is to provide an improved checker-brick.

A further and more specific object of the invention is to provide a checker-brick having a body substantially stream-lined in cross section thereby reducing resistance to flow, and the body thereof being of such size as to maintain ample heat-storage capacity to effect thorough mixing and vaporization of the gases in passing through the structure.

Other objects of the invention will appear from the following description and the accompanying drawings, and will be pointed out in the annexed claims.

In the drawings, there has been disclosed a structure designed to carry out the various objects of the invention, but it is to be understood that the invention is not confined to the exact features shown, as various changes may be made within the scope of the claims which follow.

Figure 1:
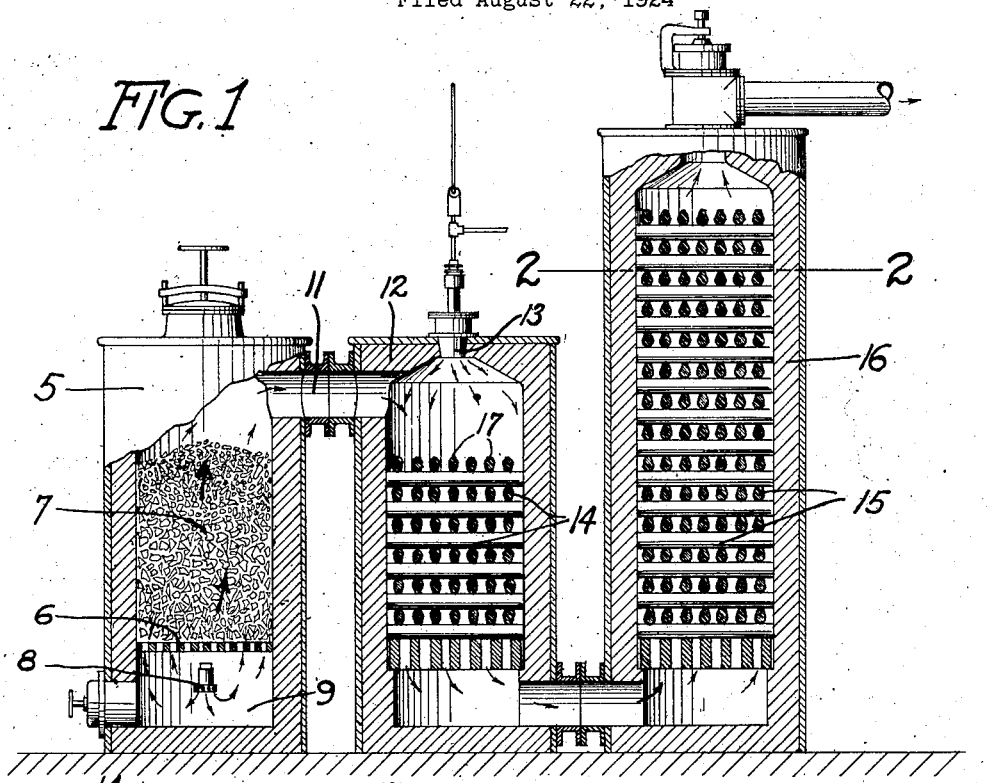
Figure 1 is a diagrammatic representation of a gas producing apparatus, showing my invention applied thereto.

In the selected embodiment of the invention here shown, there is illustrated a diagrammatic representation of a gas making apparatus such as is commonly employed in the manufacture of carbureted water gas. This apparatus comprises a generator 5 having the usual grate bars 6 mounted therein for supporting the incandescent fuel bed 7, usually of coke. The usual steam nozzle 8 is shown beneath the grate, and from this nozzle steam is introduced into the chamber or ash-pit 9 and upwardly passes through the fuel bed 7, as indicated by the arrows, which transforms it into a form of gas. This gas then passes from the generator through a passage 11 and into the carburetor 12, where it is enriched to a desired calorific quality or standard by the introduction of a suitable carburetant or enriching fluid, sprayed into the carburetor from the usual nozzle 13, as shown. The thus enriched gas then passes through the heated checker-bricks 14 arranged within the carburetor and through the checker-bricks 15 of the super-heater 16 where the elements become thoroughly mixed and permanently united, thereby producing a commercial gas adapted for use in homes and other buildings for cooking, heating, and various other uses.

Figure 3:
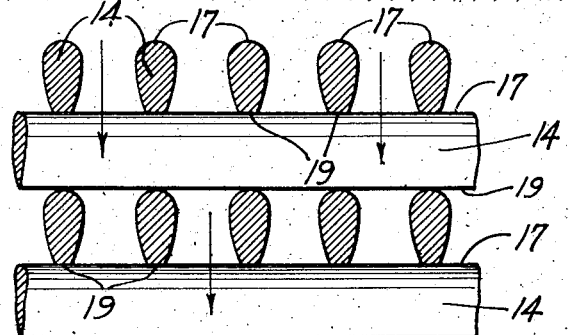
Figure 3 is an enlarged detail sectional view showing the general outline and the arrangement of the checker-bricks in the carburetor and Figure 4 is a similar view showing the arrangement of the checker-bricks in the superheater.
Figure 2:
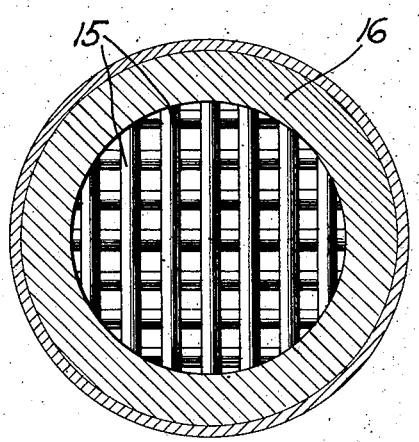
Figure 2 is a cross sectional view on the line 2—2 of Figure 1.
Figure 4:
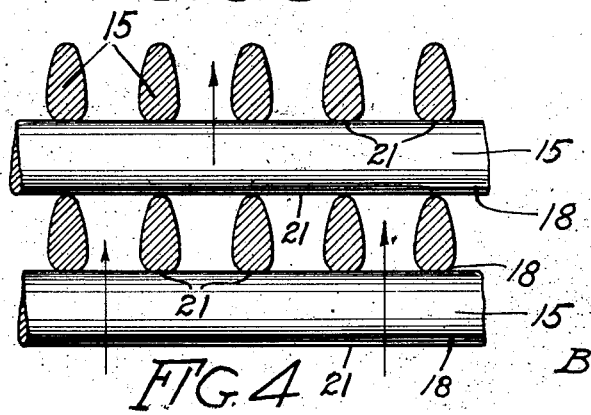

The important feature of this invention resides in the provision of an improved form of checker-brick designed for use in gas producing machines of the general type or form shown in Figure 2. As shown in Figures 3 and 4, these novel bricks are substantially stream-lined in cross-section, thereby reducing the amount of resistance offered to the flow of gas in passing through the apparatus. By stream-lined is meant that the brick surface is of such shape as to offer the least resistance to the passage of the stream of gas thereover having no angles or corners for interrupting said flow, the curved sides of the brick approaching each other and practically meeting at the central plane of the brick. Figure 3 shows the improved stream-lined bricks as arranged within the form of carburetor here shown. It will be noted that the widest edge 17 of the bricks are directed against the flow of the gas, as indicated by the arrows. Figure 4 shows the preferred arrangement of the bricks within the superheater. Here, in like manner the enlarged edges 18 of the bricks are directed against the flow of gas.

The checker-bricks 14 of the carburetor are preferably each provided with a flattened edge portion or face 19, adapted to be seated against the adjacent upper edges 17 of the bricks in the next lower layer of bricks. A similar flattened-edge portion 21 is also provided on each of the enlarged edges 18 of the checker bricks 15 of the superheater, and this flattened face, in like manner, is adapted to be seated against the adjacent bricks of each superposed layer.

The bricks are preferably arranged in layers within the gas-producing machines in checkered or reticulated form, as particularly shown in Figure 2, the bricks of each layer preferably being arranged in spaced parallel relation.

It is a well established engineering fact that a stream-line shaped body interposed in a flow of gas, using the word "gas" in the very broadest sense) will reduce the resistance offered to the flow of such gas. The advantages, therefore, in the use of stream-line shaped checker-bricks in water gas machines, will at once be obvious to anyone familiar with the true principle of stream-line. Actual experiments and tests made with water-gas machines, employing stream-lined checker bricks, have proven that with a given number of bricks per machine, greater heat-storage and oil cracking facilities can be obtained with less back pressure or resistance, than can possibly be obtained when using the ordinary type of checker-bricks having square or rectangular cross-sections. Such tests have also shown a marked reduction in the consumption of generator fuel and enriching fluid required in the manufacture of water gas, and as a result of stream-line shaped brick having substantially no corners or flat surfaces, the opportunities for carbon accumulation thereon will be considerably reduced, with a resultant prolonging of the life and therefore usefulness of the bricks.

From the foregoing, therefore, it will readily be seen that by the use of this novel form of checker-brick in conjunction with water-gas machines, of ordinary construction, such as carburetors, superheaters, and the like, the efficiency of such machines will be considerably increased. Not only are the stream-line shaped checker-bricks applicable to water gas apparatus, but to oil gas apparatus as well, and to heat recuperative installations of various sorts where regeneration takes place by means of a checkering arrangement of the bricks. In the latter case it will be possible to utilize greater recuperative capacity and at the same time reduce the amount of energy required to pass gases through such recuperators or regenerators.

Having thus described my invention what I claim as new and desire to secure by Letters Patent, is:

1. In a checker-brick device for gas producers comprising a plurality of checker-bricks arranged in superposed reticulated form and each brick being substantially stream-lined in cross-section to reduce resistance to flow therepast.

2. In a checker-brick device for gas producers comprising a plurality of checker-bricks, each checker-brick having a substantially stream-lined cross-section whereby the heat-storage capacity of the bricks may be maintained and the resistance to gaseous flow reduced, thereby to increase the output of the gas producer.

3. In a checker-brick device for gas producers comprising a plurality of checker-bricks, each brick having a substantially stream-lined cross-section to reduce resistance to flow therepast, and whereby the number of bricks in a given machine may be increased to increase the heat-storage capacity thereof without increasing the resistance or back pressure through said machine.

4. In a checker-brick device comprising a plurality of checker-bricks, said bricks being elongated and substantially stream-lined in cross-section and arranged in substantially parallel spaced relation to form a plurality of superposed layers, each superposed layer having its bricks angularly disposed with relation to the bricks of the adjacent upper and lower layers.

5. In a checker-brick device comprising a plurality of elongated checker-bricks, said checker-bricks arranged in substantially parallel spaced relation to form a reticulated structure of superposed layers, the bricks of each layer being stream-lined in cross-section and angularly disposed with relation to the bricks of the adjacent upper and lower layers, and one edge of each brick being relatively flattened to seat upon the bricks of the layer below.

In witness whereof, I have hereunto set my hand this 26th day of May, 1924.

LOUIS STEIN.